US009471380B2

(12) United States Patent
Fellenstein et al.

(10) Patent No.: US 9,471,380 B2
(45) Date of Patent: *Oct. 18, 2016

(54) DYNAMICALLY BUILDING APPLICATION ENVIRONMENTS IN A COMPUTATIONAL GRID

(71) Applicant: International Business Machines Corporation, Armonk, NY (US)

(72) Inventors: Craig W. Fellenstein, Brookfield, CT (US); Rick A. Hamilton, II, Charlottesville, VA (US); Joshy Joseph, Poughkeepsie, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/594,097

(22) Filed: Jan. 10, 2015

(65) Prior Publication Data

US 2015/0127506 A1    May 7, 2015

Related U.S. Application Data (63) Continuation of application No. 13/905,568, filed on May 30, 2013, now Pat. No. 8,966,473, which is a continuation of application No. 10/870,522, filed on Jun. 17, 2004, now Pat. No. 8,458,691, which is a continuation-in-part of application No. 10/824,808, filed on Apr. 15, 2004, now abandoned.

(51) Int. Cl.
*G06F 9/445* (2006.01)
*G06F 15/16* (2006.01)
(Continued)

(52) U.S. Cl.
CPC .............. *G06F 9/5011* (2013.01); *G06F 8/61* (2013.01); *G06F 9/5005* (2013.01); *G06F 9/5072* (2013.01); *G06Q 20/14* (2013.01); *G06F 9/4411* (2013.01)

(58) Field of Classification Search
CPC ...... G06F 8/61; G06F 9/4411; G06F 9/5005; G06F 9/5011; G06F 9/5072; G06Q 20/14; H04L 29/08144
USPC ......... 717/106–109, 174–178; 709/201–203, 709/217–219, 223–226
See application file for complete search history.

(56) References Cited

U.S. PATENT DOCUMENTS 5,361,199 A * 11/1994 Shoquist .............. G06Q 10/087
705/26.62
5,627,973 A * 5/1997 Armstrong ............. G06Q 30/02
705/7.32

(Continued)

FOREIGN PATENT DOCUMENTS

JP      11007384    * 1/1999
JP    2001306535    * 11/2001

(Continued)

OTHER PUBLICATIONS

Buyya et al., "Compute Power Market: Towards a Market-Oriented Grid," 2001, IEEE, p. 574-581.*

(Continued)

*Primary Examiner* — Qing Chen
(74) *Attorney, Agent, or Firm* — Robert H. Frantz; Maeve M. Carpenter (57) ABSTRACT

Computing environments within a grid computing system are dynamically built in response to specific job resource requirements from a grid resource allocator, including activating needed hardware, provisioning operating systems, application programs, and software drivers. Optimally, prior to building a computing environment for a particular job, cost/revenue analysis is performed, and if operational objectives would not be met by building the environment and executing the job, a job sell-off process is initiated.

12 Claims, 10 Drawing Sheets

(51) Int. Cl.
  *G06F 15/173* (2006.01)
  *G06F 9/50* (2006.01)
  *G06Q 20/14* (2012.01)
  *G06F 9/44* (2006.01)

(56) References Cited

U.S. PATENT DOCUMENTS

| | | | | |
|---|---|---|---|---|
| 5,630,156 | A * | 5/1997 | Privat | G06F 15/8023 712/11 |
| 5,765,138 | A * | 6/1998 | Aycock | G06Q 10/06313 705/7.23 |
| 5,889,989 | A * | 3/1999 | Robertazzi | G06F 9/5088 718/102 |
| 5,893,905 | A * | 4/1999 | Main | G06F 11/327 705/7.38 |
| 6,112,225 | A * | 8/2000 | Kraft | G06F 9/5072 709/201 |
| 6,356,909 | B1 * | 3/2002 | Spencer | G06Q 30/06 |
| 6,418,462 | B1 * | 7/2002 | Xu | G06F 9/5072 705/14.73 |
| 6,604,084 | B1 * | 8/2003 | Powers | G06Q 10/06395 705/7.41 |
| 6,606,602 | B1 * | 8/2003 | Kolls | G06Q 10/10 705/14.23 |
| 6,701,342 | B1 * | 3/2004 | Bartz | H04L 41/5003 370/395.21 |
| 6,792,459 | B2 * | 9/2004 | Elnozahy | G06Q 30/018 370/241 |
| 6,917,979 | B1 * | 7/2005 | Dutra | H04L 41/5009 709/207 |
| 7,058,704 | B1 * | 6/2006 | Mangipudi | H04L 41/5009 370/235 |
| 7,099,936 | B2 * | 8/2006 | Chase | G06Q 10/06 705/400 |
| 7,437,675 | B2 * | 10/2008 | Casati | G06Q 10/06 709/223 |
| 7,574,502 | B2 * | 8/2009 | Clymer | H04L 41/5016 709/224 |
| 7,765,299 | B2 * | 7/2010 | Romero | H04L 41/5025 709/224 |
| 2002/0019761 | A1 * | 2/2002 | Lidow | G06Q 10/02 705/5 |
| 2002/0072953 | A1 * | 6/2002 | Michlowitz | G06Q 10/06 705/7.39 |
| 2002/0077836 | A1 * | 6/2002 | Elnozahy | G06Q 30/018 709/224 |
| 2002/0107723 | A1 * | 8/2002 | Benjamin | G06Q 10/04 705/7.29 |
| 2002/0166117 | A1 * | 11/2002 | Abrams | G06Q 20/145 717/177 |
| 2003/0097422 | A1 * | 5/2003 | Richards | G06F 8/61 709/217 |
| 2003/0120771 | A1 * | 6/2003 | Laye | H04L 12/2602 709/224 |
| 2004/0148373 | A1 * | 7/2004 | Childress | G06F 11/3495 709/223 |
| 2004/0215590 | A1 * | 10/2004 | Kroening | G06F 9/5072 |
| 2005/0138618 | A1 * | 6/2005 | Gebhart | G06F 8/60 717/176 |
| 2005/0160413 | A1 * | 7/2005 | Broussard | G06F 9/4856 717/148 |
| 2006/0294238 | A1 * | 12/2006 | Naik | G06F 9/5072 709/226 |

FOREIGN PATENT DOCUMENTS

| | | | |
|---|---|---|---|
| JP | 2003507817 | * | 2/2003 |
| JP | 2004110791 | * | 4/2004 |
| WO | WO03014928 | * | 2/2003 |
| WO | WO03107203 | * | 12/2003 |

OTHER PUBLICATIONS

Wolski et al., "G-commerce: Market Formulations Controlling Resource Allocation on the Computational Grid," 2001, IEEE, p. 1-8.*

Buyya et al., "Economic models for resource management and scheduling in Grid computing," 2002, John Wiley & Sons, Ltd., p. 1507-1542.*

Milenkovic et al., "Toward Internet Distributed Computing," 2003, IEEE, p. 38-46.*

Moore et al., "Cluster on Demand," 2002, Duke University, p. 1-25.*

Phan et al., "Challenge: Integrating Mobile Wireless Devices Into the Computational Grid," 2002, ACM, p. 271-278.*

Casanova, Henri, "Distributed Computing Research Issues in Grid Computing," 2002, ACM, p. 50-70.*

Yang et al., "Towards Efficient Resource on-Demand in Grid Computing," 2003, ACM, p. 37-43.*

Berstis, Viktors, "Fundamentals of Grid Computing", IBM Redbooks Paper, copyright 2002, all 28 pages, no volume or issue number, published by IBM Corp., Austin, Texas, USA, downloaded on Mar. 2, 2004,http://publib-b.boulder.ibm.com/Redbooks.nsf/RedbookAbstracts/REDP35- 13.html.*

* cited by examiner

Figure 1

| 21 | 22 | 23 | 24 | 25 | 26 | 27 |
|---|---|---|---|---|---|---|
| Grid Vendor Rating Report | | | | | | |
| Grid Vendor | Completed the Job | On Time Performance | Interactive performance | Adhered to Agreed Cost | Returned Proper Results | Total Vendor Rating |
| Grid ABC Co. | 100% | 99.6% | 97.7% | 100% | 100% | 99.46% |
| Grid XYZ Co. | 100% | 96.4% | 92.3% | 98.4% | 100% | 97.42% |

DYNAMICALLY BUILDING APPLICATION ENVIRONMENTS IN A COMPUTATIONAL GRID

CROSS-REFERENCE TO RELATED APPLICATIONS

This patent application is a continuation of U.S. patent application Ser. No. 13/905,568, filed on May 30, 2013, now U.S. Pat. No. 8,966,473, and which is a continuation of U.S. patent application Ser. No. 10/870,522, filed on Jun. 17, 2004, now U.S. Pat. No. 8,458,691, and which is a continuation-in-part of U.S. patent application Ser. No. 10/824,808, filed on Apr. 15, 2004, now abandoned, all of which have a common inventor, Rick Allen Hamilton, II, and are or were commonly assigned at the time of their filing.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

None.

BACKGROUND OF THE INVENTION

1. Field of the Invention

This invention relates to the arts of on demand grid-based computing, and management and allocation of resources within a grid computing environment.

2. Description of the Related Art

In the 1990's, the communications standardization between wide ranges of systems propelled the Internet explosion. Based upon the concept of resource sharing, the latest evolutionary technology is grid computing.

Grid computing is an emerging technology that utilizes a collection of systems and resources to deliver qualities of services. It is distributed computing at its best, by creating a virtual self-managing computer, the processing for which is handled by a collection of interconnected heterogeneous systems sharing different combinations of resources. In simple terms, grid computing is about getting computers to work together, and allowing businesses, or grid participants, to optimize available resources.

The framework to grid computing is large scale resource sharing, which exist within multiple management domains, typically involving highly parrallelized applications connected together through a communications medium, and organized to perform one or more requested jobs simultaneously. Each grid resource's characteristics can include, but are not limited, to processing speed, storage capability, licensing rights, and types of applications available.

Grid computing's architecture is defined in the Open Grid Services Architecture ("OGSA"), which includes a basic specification Open Grid Services Infrastructure ("OGSI").

Using grid computing to handle computing jobs of all sizes, and especially larger jobs such as enterprise processes, has several advantages. First, it exploits underutilized resources on the grid. For example, if a financial services company suddenly encounters a 50% increase in stock trade transactions during a 30-minute time period, using a traditional systems process, the company would face an increase in network traffic, latent response and completion time, bottleneck in processing and even overload on its resources due to its limited or fixed computational and communications resources.

In a similar situation, however, grid computing can adjust dynamically to meet the changing business needs, and respond instantly to stock transaction increase using its network of unused resources. For example, a grid computing system could run an existing stock trading application on four underutilized machines to process transactions, and deliver results four times faster than the traditional computing architecture. Thus, grid computing provides a better balance in resource utilization and enables the potential for massive parallel CPU capacity.

Second, because of its standards, grid computing enables and simplifies collaboration among many resources and organizations from a variety of vendors and operators. For instance, genome research companies can use grid computing to process, cleanse, cross-tabulate and compare massive amounts of data, with the jobs being handled by a variety of computer types, operating systems, and programming languages. By allowing the files or databases to span across many systems, data transfer rates can be improved using striping techniques that lead to faster processing giving the companies a competitive edge in the marketplace.

Third, grid computing provides sharing capabilities that extends to additional equipment, software, services, licenses and others. These virtual resources provide uniform interoperability among heterogeneous grid participants. Each grid resource may have certain features, functionalities and limitations. For example, a particular data mining job may be able to run on a DB2 server, but may not be compatible to be processed on an Oracle server. So, the grid computing architecture selects a resource which is capable of handling each specific job.

International Business Machines ("IBM") has pioneered the definition and implementation of grid computing systems. According to the IBM architecture, Service Level Agreements ("SLAs") are contracts which specify a set of client-driven criterion directing acceptable execution parameters for computational jobs handled by the grid. SLA parameters may consist of metrics such as execution and response time, results accuracy, job cost, and storage and network requirements. Typically, after job completion, an asynchronous process which is frequently manual is performed to compare actual completion. In other words, companies use SLAs to ensure all accounting specifics such as costs incurred and credits obtained conforms to the brokered agreements. The relationship between a submitting client and grid service provider is that of a buyer (client) and a seller (grid vendor).

In order for grid and on-demand computing to be successful, maximum automation of grid related processes needs to occur. Due to the fact that grid computing is a relatively new and emerging art, many processes have yet to be considered for automation, and as such, require inefficient manual interaction.

IBM's grid computing architecture provides an automated and efficient mechanism to allocate and enable the specific hardware and software environment required for job execution in a grid or on-demand computing system, responsive dynamically to the receipt of new jobs. However, at certain times depending on job load and job requirements within the grid, adequate resources to handle a newly submitted job may not be available. Unavailability may result from the fact that hardware and software which are capable of handling the job are already allocated to other jobs, or that no hardware and software are currently configured in the grid in a fashion which could handle the job, or combinations of both reasons.

Therefore, there is a need in the art for a mechanism which, if the current active and available grid hardware does not contain the software environment(s) required by inbound grid jobs, to build the required software environment in an automated manner. The software involved may include the base operating system, specific device drivers, application software, and other components. Build of the appropriate software environment may include complete build of a new software environment on new hardware, build of a supplement set of nodes to integrate in with other existing nodes in order to complete a required environment, or simply build of required applications on existing active nodes, according to the need in the art.

DESCRIPTION OF THE DRAWINGS

The following detailed description when taken in conjunction with the figures presented herein present a complete description of the present invention.

SUMMARY OF THE EXEMPLARY EMBODIMENTS OF THE INVENTION

Through use of the present invention, a computing grid can offer more advanced resource load balancing. A relatively idle machine may receive an unexpected peak job, or if the grid is fully utilized, priorities may be assigned to better execute the number of requested jobs. By using our Dynamic Application Environment Builder ("DAEB") in conjunction with a Grid Management System ("GMS") scheduler such as the IBM GMS, a computing grid can provide excellent infrastructure for brokering resources.

Generally speaking, as jobs flow into our computational grid for execution, an automated and efficient mechanism allocates and enables the specific hardware and software environment required for job execution. Additionally, if the current active grid hardware does not contain the software environment(s) required by inbound grid jobs, the processes of the invention build the required software environment in an automated manner. The software resources required and provided by the build may include a base operating system, one or more specific device drivers, one or more application software programs, and other components.

Building of the appropriate software environment may include complete build of a new software environment on new hardware, build of a supplement set of nodes to integrate in with other existing nodes in order to complete a required environment, or simply build of required applications on existing active nodes.

DETAILED DESCRIPTION OF THE EXEMPLARY EMBODIMENTS OF THE INVENTION

The present invention is preferably realized in conjunction with a grid computing architecture, and especially with the grid computing environment offered by International Business Machines. Therefore, it will be useful to first establish some definitions and discuss some generalities of grid computing concepts prior to presenting details of the present invention.

Fundamentals of Grid Computing

The following definitions will be employed throughout this disclosure:

(a) "Grid" shall mean of a collection of computing resources such as servers, processors, storage systems, and communications media, ranging from just a few machines to groups of machines organized as a hierarchy potentially spanning the world;

(b) "Job" shall mean a desired requested task that a client initiates to be processed using available and selected resources;

(c) "Resources" shall mean any system, hardware or software module that is available within a grid for use in completing a job, such as application programs, hardware, software licenses, storage and related components;

(d) computing environment or "environment" for short shall mean a set of hardware and software resources, such as a process, memory, disk space, operating system and one or more application programs, which are used to process or execute a job; and (e) "SLA" shall refer specifically to an IBM Service Level Agreement, and more generically to any documented set of client-driven criteria for job handling on a grid, including but not limited to processing accuracy, results format, processing time for completion, and cost of job processing.

As previously discussed, IBM has pioneered the development of systems, architectures, interfaces, and standards for open grid computing. As grid computing is relatively new in the field of computing, we will first provide an overview of grid computing concepts and logical processes. Additional information regarding grid computing in general is publicly available from IBM, several other grid computing suppliers and developers, a growing number of universities, as well as from appropriate standards organizations such as the Open Grids Computing Environment ("OGCE") consortium. The following description of grid computing uses a generalized model and generalized terminology which can be used equally well to implement the invention not only in an IBM-based grid environment, but in grid environments comprised of systems and components from other vendors, as well.

Figure 5:
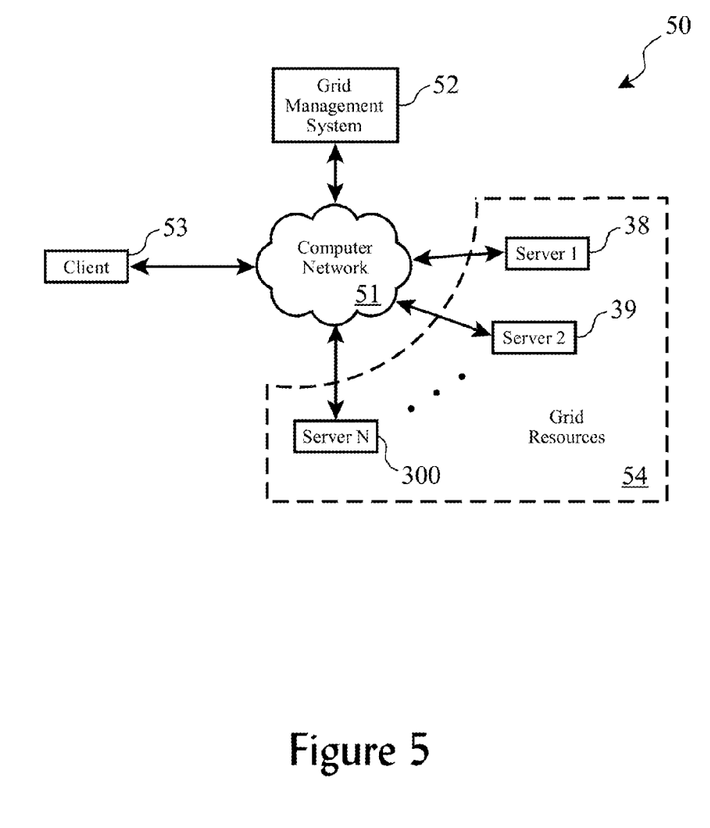
FIG. 5 shows a high-level view of grid computing in general.

Turning to FIG. 5, the new computing paradigm of grid computing (50) is illustrated at a high level. A client (53), such as an FBI analyst using a client computer, requests a computational job or task, a cross-agency list of suspected terrorists, to be performed by the grid. The job is submitted via a communications network (51) to a Grid Management System ("GMS"), which makes a selection of which grid vendor(s) (54) to use based on client job criteria (e.g. response time, cost, accuracy, etc.) and resource characteristics, such as server capability, resource availability, storage capacity, and cost.

Once the GMS determines a specific vendor(s) (38, 39, 300) to which the job will be assigned (or among which the job will be divided), requests are sent to the selected grid resources, such as Server 1 (38). Server 1 (38) would then process the job as required, and would return job results, back to the requesting client (53) via the communications network (51).

Figure 3:
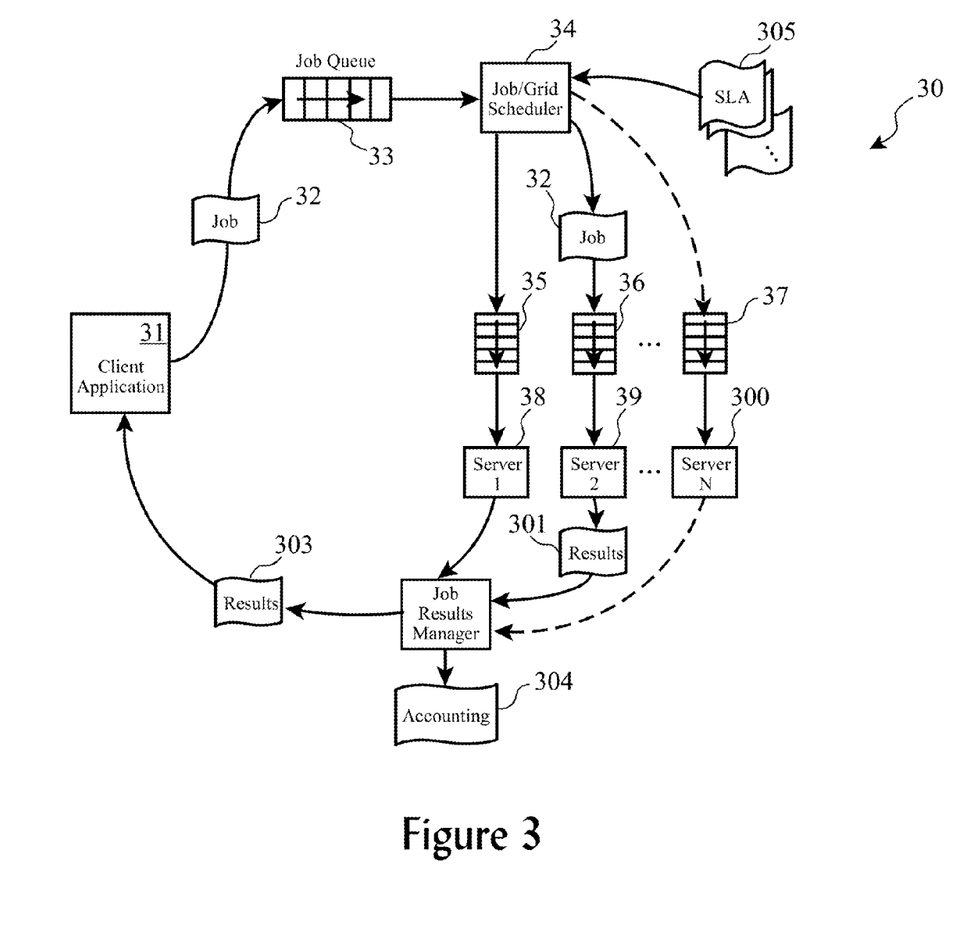
FIG. 3 provides details of how grid computing functions are accomplished in general.

FIG. 3 provides a more detailed illustration (30) of how grid computing functions at a lower level. When a job (32) is submitted by a client application (31) to the grid, the job (32) is received into a grid inbound job queue (33), where it awaits assignment to one or more grid resources.

A Job/Grid Scheduler ("JGS") (34) retrieves each pending job from the inbound job queue (33), verifies handling requirements against one or more SLA (305) to determine processing requirements for the job, and then selects which server or servers (28, 29, 300) to assign to process the job (32). In this illustration, Server 2 (39) has been selected, so the job (32) is transferred to Server 2' job queue (36) to be processed when the server becomes available (immediately if adequate processing bandwidth is already available). Some servers may handle their job queues in an intelligent manner, allowing jobs to have priority designation which allows them to be processed quicker or sooner than earlier-received, lower priority jobs.

Eventually, the assigned server completes the job and returns the results (301) to a Job Results Manager ("JRM") (302). The JRM can verify job completion and results delivery (303) to the client application (31), and can generate job completion records (304) as necessary to achieve billing and invoice functions.

Figure 4:
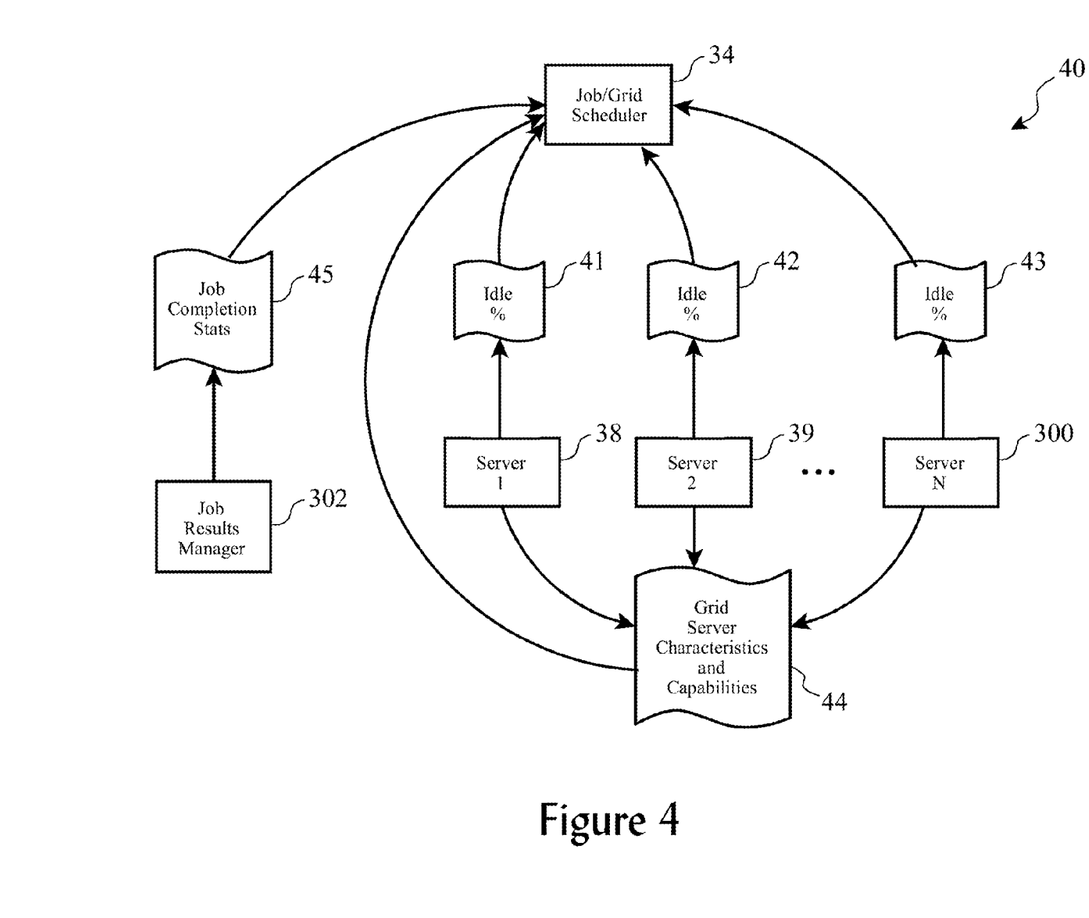
FIG. 4 illustrates functionality for selecting a grid resource.

Turning now to FIG. 4, more details of the resource selection process (40) are shown. Each grid resource (38, 39, 300) may report in real-time its availability or "percent idle" (41, 42, and 43) to the Job/Grid Scheduler (34). Additionally, a set of grid resource characteristics and capabilities (44) is compiled, either statically, dynamically, or both, which is also available for the JGS (34) to use. Some server characteristics may be static, such as hardware characteristics (e.g. installed memory, communications protocols, or licenses), which other characteristics may be more dynamic in nature, such as number of licenses available for a certain application program (e.g. PDF generators, video compressors, etc.). Additionally, the completion statistics (45) from the Job Results Manager (302) are preferably available to the JGS (34), as well.

Through consideration of these factors regarding the grid resources, and in combination with the SLA client requirements, the JGS can select one or more appropriate grid resources to which to assign each job. For example, for high-priority jobs which require immediate processing, the JGS may select a resource which is immediately available, and which provides the greatest memory and processing bandwidth. For another job which is cost-sensitive but not time critical, the JGS may select a resource which is least expensive without great concern about the current depth of the queue for handling at that resource.

Computing Platform Suitable for Realization of the Invention

The invention, in one available embodiment, is realized as a feature or addition to software products, such as IBM's grid computing products, for execution by well-known computing platforms such as personal computers, web servers, and web browsers.

As the computing power, memory and storage, and communications capabilities of even portable and handheld devices such as personal digital assistants ("PDA"), web-enabled wireless telephones, and other types of personal information management ("PIM") devices, steadily increases over time, it is possible that the invention may be realized in software for some of these devices, as well.

Therefore, it is useful to review a generalized architecture of a computing platform which may span the range of implementation, from a high-end web or enterprise server platform, to a personal computer, to a portable PDA or web-enabled wireless phone.

Figure 6:
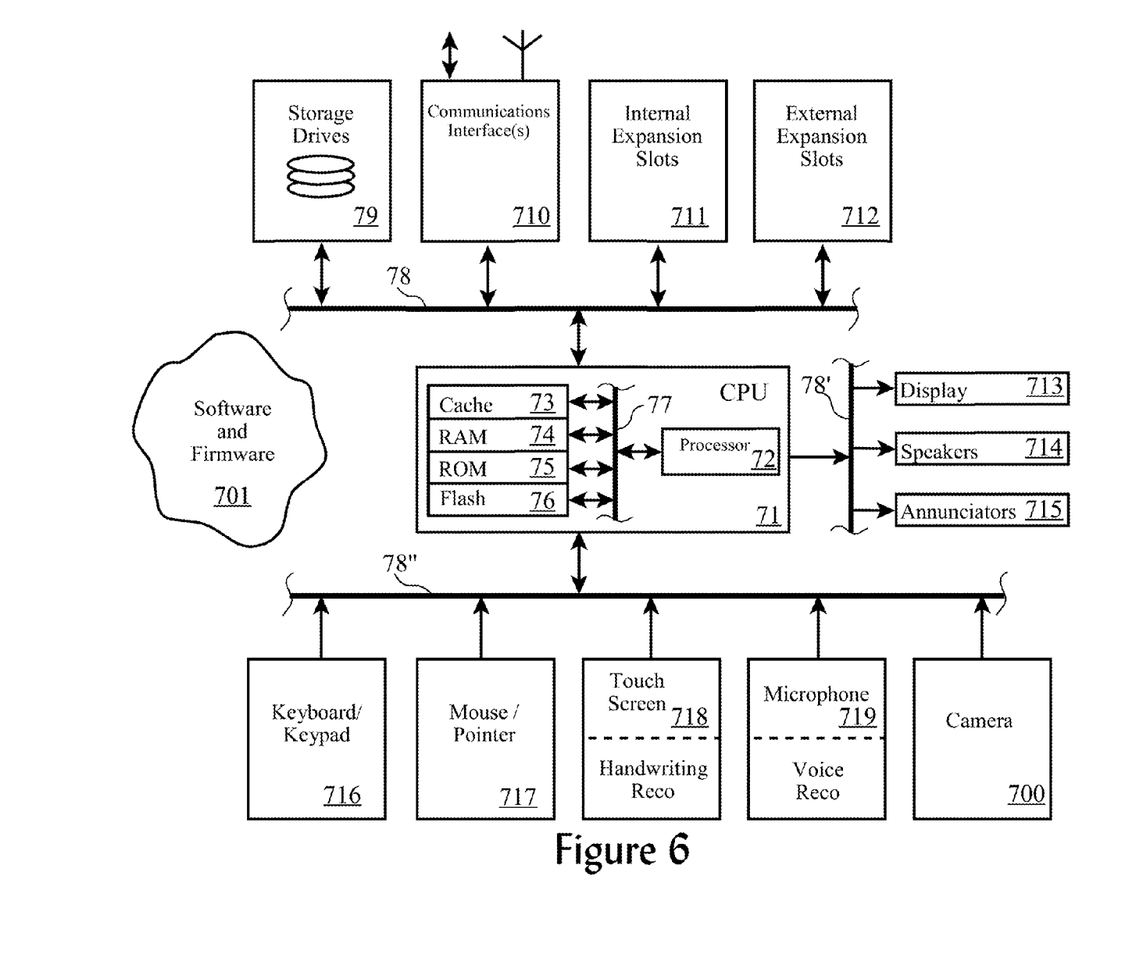
FIG. 6 provides depicts a generalized computing platform, suitable for implementation of the invention according to one available embodiment.

Turning to FIG. 6, a generalized architecture is presented including a central processing unit (71) ("CPU"), which is typically comprised of a microprocessor (72) associated with random access memory ("RAM") (74) and read-only memory ("ROM") (75). Often, the CPU (71) is also provided with cache memory (73) and programmable FlashROM (76). The interface (77) between the microprocessor (72) and the various types of CPU memory is often referred to as a "local bus", but also may be a more generic or industry standard bus.

Many computing platforms are also provided with one or more storage drives (79), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (710), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (811), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (712) allowing the user the ability to easily install and remove hardware expansion devices, such as PCMCIA cards, SmartMedia cards, and various proprietary modules such as removable hard drives, CD drives, and floppy drives.

Often, the storage drives (79), communication interfaces (810), internal expansion slots (711) and external expansion slots (712) are interconnected with the CPU (71) via a standard or industry open bus architecture (78), such as ISA, EISA, or PCI. In many cases, the bus (78) may be of a proprietary design.

A computing platform is usually provided with one or more user input devices, such as a keyboard or a keypad (716), and mouse or pointer device (717), and/or a touch-screen display (718). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (718) is usually provided, often with handwriting recognition capabilities.

Additionally, a microphone (719), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (7100), such as a still digital camera or full motion video digital camera.

One or more user output devices, such as a display (713), are also provided with most computing platforms. The display (713) may take many forms, including a Cathode Ray Tube ("CRT"), a Thin Flat Transistor ("TFT") array, or a simple set of light emitting diodes ("LED") or liquid crystal display ("LCD") indicators.

One or more speakers (714) and/or annunciators (715) are often associated with computing platforms, too. The speakers (714) may be used to reproduce audio and music, such as the speaker of a wireless telephone or the speakers of a personal computer. Annunciators (715) may take the form of simple beep emitters or buzzers, commonly found on certain devices such as PDAs and PIMs.

These user input and output devices may be directly interconnected (78', 78") to the CPU (71) via a proprietary bus structure and/or interfaces, or they may be interconnected through one or more industry open buses such as ISA, EISA, PCI, etc. The computing platform is also provided with one or more software and firmware (7101) programs to implement the desired functionality of the computing platforms.

Figure 7:
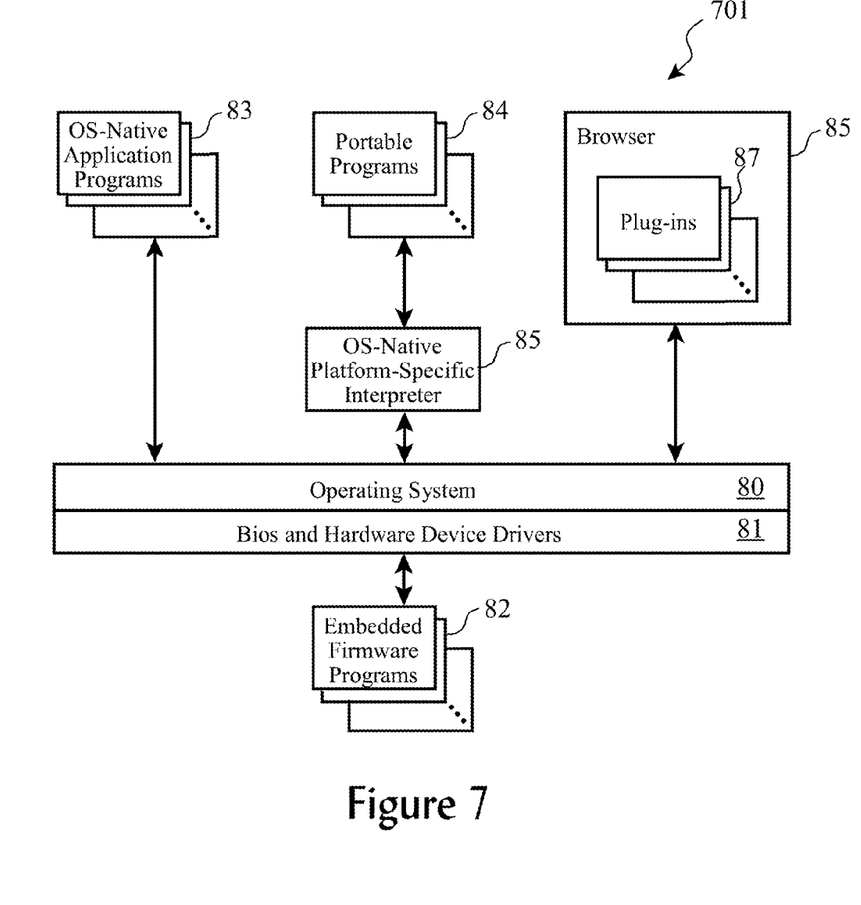
FIG. 7 provides more details of the software organization of the platform of FIG. 6.

Turning to now FIG. 7, more detail is given of a generalized organization of software and firmware (7101) on this range of computing platforms. One or more operating system ("OS") native application programs (823) may be provided on the computing platform, such as word processors, spreadsheets, contact management utilities, address book, calendar, email client, presentation, financial and bookkeeping programs.

Additionally, one or more "portable" or device-independent programs (824) may be provided, which must be interpreted by an OS-native platform-specific interpreter (825), such as Java™ scripts and programs.

Often, computing platforms are also provided with a form of web browser or micro-browser (826), which may also include one or more extensions to the browser such as browser plug-ins (827).

The computing device is often provided with an operating system (820), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (821) are often provided to allow the operating system (820) and programs to interface to and control the specific hardware functions provided with the computing platform.

Additionally, one or more embedded firmware programs (822) are commonly provided with many computing platforms, which are executed by onboard or "embedded" microprocessors as part of the peripheral device, such as a micro controller or a hard drive, a communication processor, network interface card, or sound or graphics card.

As such, FIGS. 6 and 7 describe in a general sense the various hardware components, software and firmware programs of a wide variety of computing platforms, including but not limited to personal computers, PDAs, PIMs, web-enabled telephones, and other appliances such as WebTV™ units. It will be readily recognized by those skilled in the art that the methods and processes disclosed herein may be alternatively realized as hardware functions, in part or in whole, without departing from the spirit and scope of the invention.

Other Grid Products from IBM and Tivoli

There are two previously available products to which the present invention relates, but compared to which the present invention provides substantial performance and functional advantages:

(1) Tivoli's Think Dynamic (a.k.a. IBM Tivoli Provisioning Manager and IBM Tivoli Intelligent Orchestrator) Provisioning Manager(s), which manages static building, deploying, configuring and reclaiming resources to and from application environments. It enables building of workflows that automate "best practices" to deploy and augment n-tier application environments, and provides out-of-the-box automated provisioning for networks, servers, storage, middleware and application services.

(2) IBM Websphere™ Server Allocation Workload Manager, which enables pooling of WebSphere™ resources (e.g. software components and resources) and have applications respond quickly to the dynamic needs of the enterprise. This offering was designed to balance workloads and allocate resource for WebSphere software environments—increasing their utilization of resources. This approach, however, employed a static allocation mechanism.

Even though there are some similarities in the core concepts with the present invention, these other IBM and Tivoli products differ from the current invention based on the extended algorithmic aspects on resource allocation based on agreed pricing selections, collaborating with remote allocation managers and external grid systems for dynamic environment building/job hand-over, and job rejection criterions. Our new DAEB algorithmic approach and the collaboration with other system components is more advanced than that of the above products.

It is possible, in some embodiments, for the present invention to utilize these or other similar products for fine-grain resource allocation based on the job requirements and resource usage criteria.

Grid Vendor Rating System

Our new grid service provider vendor rating system is both systematic and automated. Collected performance data is used to automatically generate ratings relative to Service Level Agreement ("SLA") criteria, which enables clients, vendors, or the grid management processes to select resources and delegate jobs to those resources for improved compliance to SLA requirements and objectives. Furthermore, the new rating system applies a standard format to each grid vendor, and tracks SLA compliance, in our preferred embodiment. With the performance data collected and consistently and fairly analyzed, powerful reports can be produced for clients, vendors, and grid management administrators, as well.

As previously discussed, the present invention may be alternately realized in conjunction with a wide variety of grid computing products, resources, and clients, and is especially well suited for implementation with the IBM grid environment.

Figure 10:
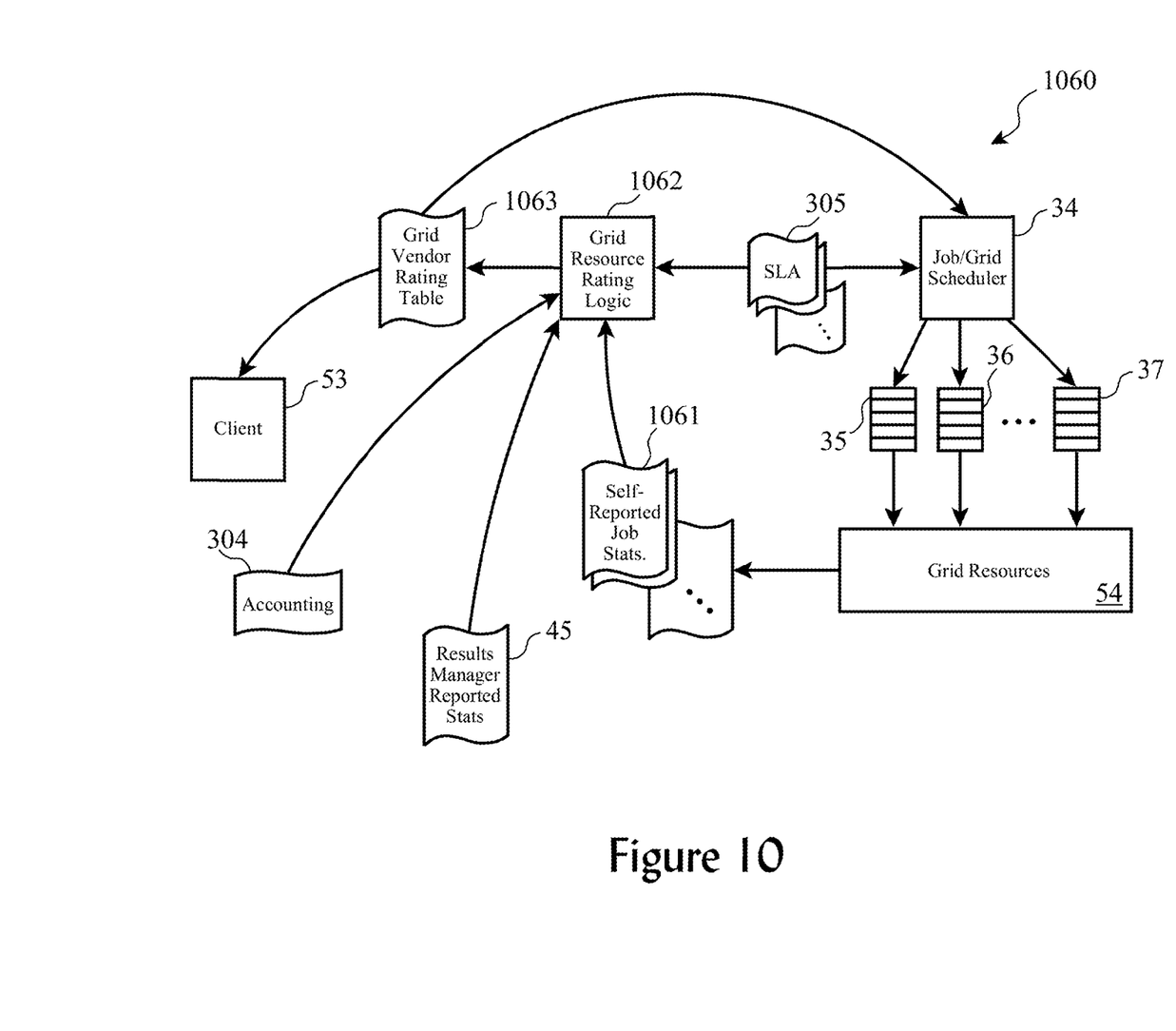
FIG. 10 provides details of the logic of at least one embodiment of the present invention for producing and using a grid vendor rating table.

FIG. 10 illustrates a grid computing environment (1060) enhanced with the processes and logical devices according to the present invention. A Grid Vendor Rating Table ("GVRT") (1063) is provided using a generation method described in the following paragraphs.

When a client (53) submits a job to the grid, the client may optionally access the Grid Vendor Rating Table (1063) to review comparative and historical performance data based on client preferences such as cost, completion time, response time, availability and level of security. Thus, a client may enhance its job request to specify or request handling by a specific resource or set of resources. As the Grid Vendor Rating Table is dynamically generated and updated, the client's request become a time-relevant factor in the client's job requirements. Vendors who are aware of the availability of this table to the clients will be motivated to provide systems and resources which consistently perform to specification to increase job flow to their servers, thereby enhancing the overall performance of the grid.

According to another aspect of the present invention, the Job/Grid Scheduler is provided access to the Grid Vendor Rating Table (1063) to enhance its ability to select resources which not only appear to be capable of handling the job according to the resources characteristics and the client SLA, but also according to each resource's historical performance.

In a further enhanced embodiment of the present invention, the Grid Vendor Rating Table(s) are available to both the client and the JGS such that both entities can select and screen resources which may or may not perform as desired or expected. Separate tables (not shown) may be maintained for each client, each resource, and for the JGS, allowing a variety of prioritization and factor weighting schemes to be employed to further enhance the selection process.

Grid Vendor Rating Table Generation

Our rating tables are generated by our Grid Resource Rating Logic ("GRRL") (1062) based upon data gathered from a number of potential sources. Ideally, all sources are used to generate the table, but in alternate embodiments, some sources may be eliminated or estimated.

The rating logic (1062) obtains real-time data from grid resources (54) in self-reported job statistics (1061), as well as statistics (45) reported from the Results Manager. Preferably, accounting information (34) may also be received by the rating logic (1062) to allow it to include cost-to-performance considerations in the rating process.

The GRRL (1062) automatically compares job processing data for each job and each resource against related SLA criterion to determine if contractual agreements were met. A Grid Vendor Rating Table (1063) is created containing the results of the analysis (or updated to contain the results of the most recent analysis), such as the example table shown in FIG. 2. This table may be produced in human readable form, such as in a spreadsheet file or a printed report, and is preferably provided in a machine readable format as well, such as a data file (CSV, binary, DB2, HTML, XML, etc.).

Figure 2:
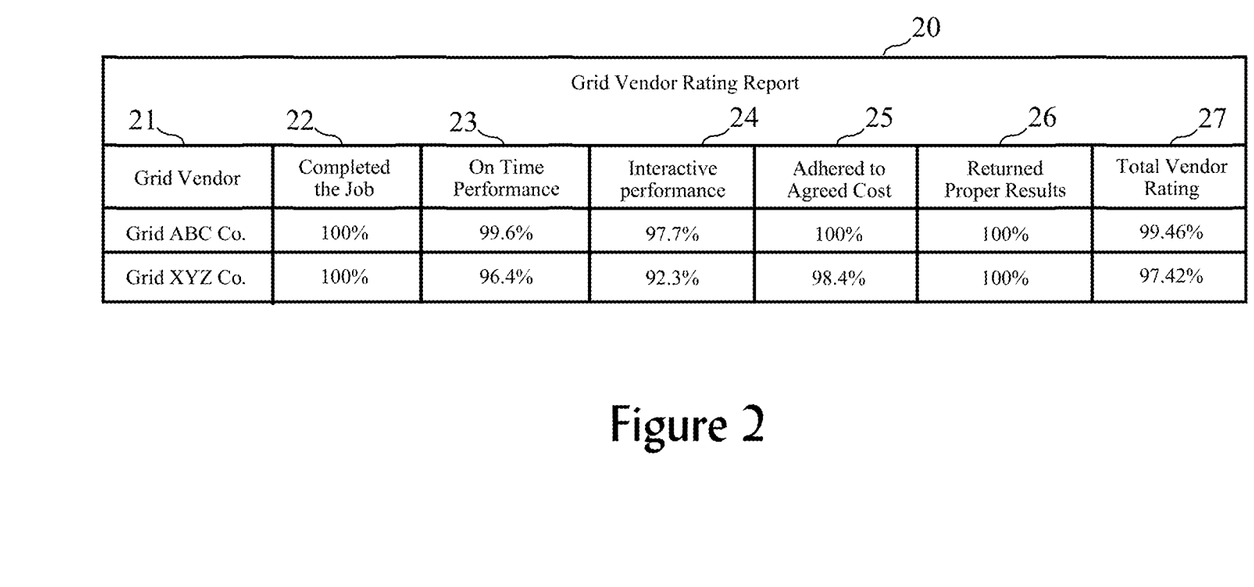
FIG. 2 depicts one available Grid Vendor Rating Report produced by an embodiment of the present invention.

As shown in FIG. 2, an example (20) Grid Vendor Rating Table includes one or more entries (e.g. rows in this depiction), each entry representing one or more performance historical factors for a particular vendor (e.g. ABC Co. or XYZ co.) (21). Each entry has one or more fields which represent the results of a particular analysis, such as percentage of jobs completed (22), percentage of jobs completed within allowed time constraints (23), responsiveness to jobs which are interactive in nature (24), compliance to cost estimates or cost schedules (25), accuracy of results (26), and an overall or composite vendor rating (27). These are example analyses results only, and do not represent the full scope of possible results, of course.

Further, the overall vendor rating (27) is preferably determined either by an equal rating approach for all of the individual analysis results, or by applying a weighting scheme to the individual analysis results in order to prioritize certain performance characteristics as needed according to a client's requirements, or according to a grid performance objective. For example, a particular client may always prefer accuracy over cost and timeliness, and as such, the overall ratings for that client's table(s) may place greater weight on the accuracy individual analysis results when determining an overall rating for a vendor. In another example, a particular grid may be advertised or touted as a high-speed grid designed especially for time-critical jobs, and as such, the rating table(s) for that grid may place greater weight on the on time performance individual analysis results.

Other analyses, table formats, and fields within the table may optionally include:
  (a) an indication of the number of jobs upon which a particular score or ranking is based;
  (b) an indication of the age of the data upon which a particular score or ranking is based (e.g. current data, 30 day data, 60 day data, etc.);
  (c) a ranking of each vendor relative to the other vendors included in the table; and
  (d) scores broken down by application or job type, such as Online Transaction Processing ("OLTP"), batch, database, and scientific types of applications.

Grid Vendor Rating Logic

Figure 1:
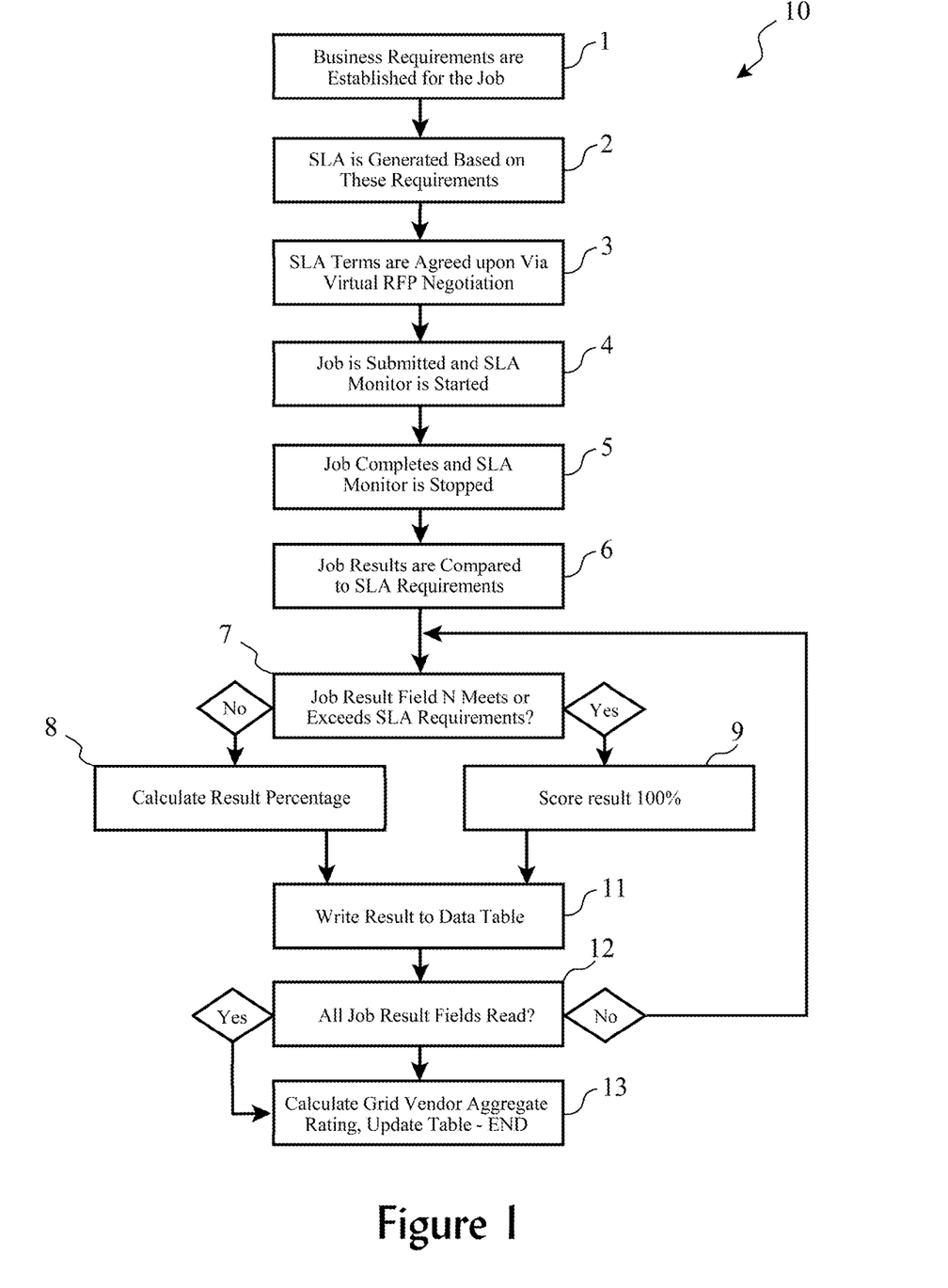
FIG. 1 illustrates a logical process according to at least one aspect of the present invention.

Turning now to FIG. 1, the logic (10) of the present invention is shown at a high level. This logic may be implemented in hardware, such as in programmable logic or custom integrated circuits, in software such as C or Java programs, or using a combination of both. Additionally, the logic may be centrally located, or may be distributed among two or more platforms such as servers, computers, and circuit cards.

Initially, a client establishes (1) its own set of business requirements, such as desired completion time within 24 hours with high level of security. Then, an SLA is generated (2) based on client's business requirements. The SLA agreement is then negotiated (3), preferably via a virtual Request for Proposal process, which replaces the previous manual processes for RFP submission and response.

Following establishment of an SLA, the client's job is submitted (4) and SLA monitoring begins, which tracks vendor performance statistics as previously described. When a job completes, the SLA monitoring also stops (5). The job results are compared against SLA (6), including consideration of resource self-reported statistics as previously described, to check if it meets the SLA requirements (7).

Each field of the job results is considered individually, such as a bank account statement having ending balance, average daily balance, interest accrued, and fees charged fields. If a result field meets the SLA requirement, a high score such as 100% is assigned (9) to that field. If a discrepancy is detected in the result field (e.g. accuracy was low, format was incorrect, result was out of range, etc.), then a less-than-optimal score is assigned to that field. The individual field score(s) are then saved to an intermediate table (11), and remaining job fields are processed similarly (12) until all job results fields are considered and scored.

Then, overall ratings for all fields are considered, as well as other job-specific performance information (e.g. was job completed within allowed time limits, was the cost of the job met, etc.), and a Grid Vendor Rating Table is yielded.

Any number of statistical and/or logical methods may be applied to generate the individual field scores, as indicated by the type of information and data. Likewise, a wide variety of methods for generating overall ratings of various times, as previously outlined, may be employed to generate the detailed contents of the Grid Vendor Rating table.

Dynamic Application Environment Builder

Figure 8:
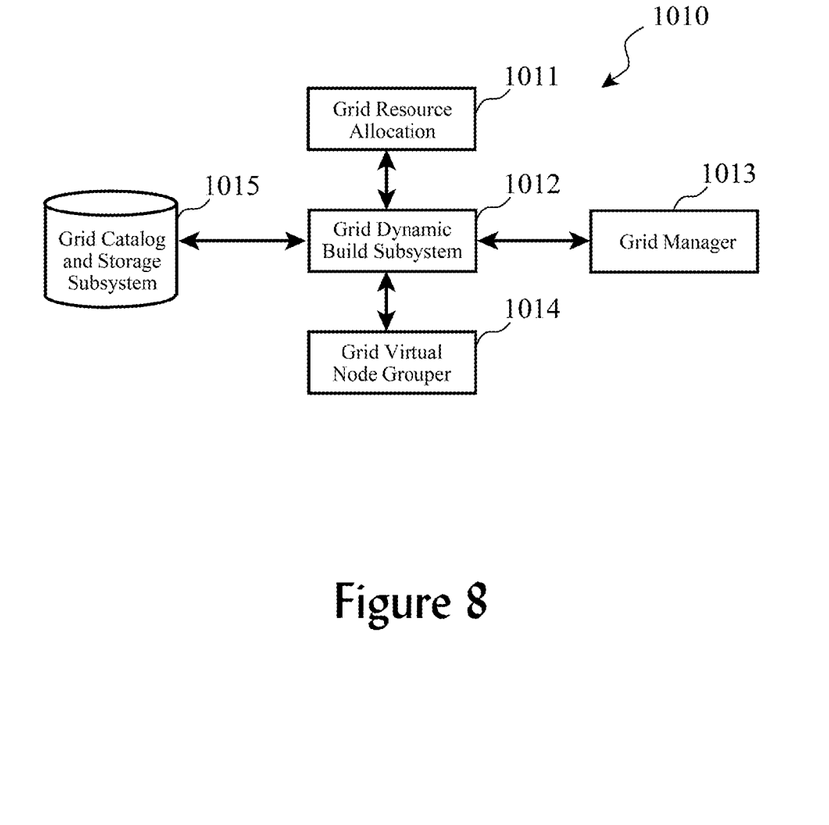
FIG. 8 provides a high-level illustration of intra-grid relationships between embodiments of the present invention and the processes of a grid computing environment.

In order for the grid dynamic build subsystem to function efficiently, our DAEB subsystem communicates with other logic modules within the grid, preferably within a computing grid architecture as defined by and provided by International Business Machines ("IBM"). FIG. 8 depicts our intra-grid relationships (1010), which will be discussed further in the following paragraphs:

(a) a grid allocation or management system (1011);
(b) a grid manager (1013);
(c) a grid catalog and storage subsystem (1015);
(d) a grid virtual node grouper (1014); and
(e) our new grid dynamic environment builder (1012), the subject of the present invention.

It will be apparent to those skilled in the art that this high-level functional organization is not the only embodiment in which the present invention may be employed. Alternatively, the present invention may be employed with other on-demand computing architectures and grid architectures.

As previously described, IBM grid products provide methods and systems responsive to an incoming grid job whereby the resources required to execute said job are identified and provided to the inbound job in an automated fashion. This kind of process automation is a necessity if grid computing is to continue to grow and meet the ever increasing needs of clients for on-demand services.

A related issue which also must be addressed is how the gird vendor manages the situation when the software environment required by the inbound grid job is not currently available. The requested environment may be one which is known and offered by the grid services provider, but which does not currently exist anywhere within the grid environment or, it could be an environment in active use by other jobs, but which is over-allocated and is not available for use by any new jobs.

The present invention addresses this problem by providing an automated grid subsystem which is capable of dynamically building the required software environment so that the allocation subsystem can then provide the necessary resources to the inbound job. The functionality in the present art is optionally incorporated into existing grid scheduling/management subsystems, but according to the preferred embodiment, is realized as a separate logic module which communicates with the grid management and resource allocation subsystems.

One goal of our dynamic application environment build subsystem is that as inbound grid job requirements exceed the capabilities of the current active grid environment, to perform, the following services:

1. Accept data from resource allocation subsystem when build of an environment is required.
2. Query grid catalog and storage subsystem to determine availability of required software resources.
3. Communicate availability of resources to allocation subsystem.
4. Evaluate desirability of building an environment for the proposed job with the grid manager and allocation subsystems.
5. Decide to reject job (see Note 3 below), OR, decide to build relevant environment.
6. Request required OS from grid catalog and storage subsystem, if required.
7. Network install required OS on node(s), if required.
8. Request required application(s) from grid catalog and storage subsystem, if required.
9. Network install required application(s) on node(s), if required.
10. Inform grid allocation subsystem build is complete.

When currently active resources are not sufficient to meet the needs of an inbound grid job, then it is possible to dynamically build new grid resources in order to satisfy job requirements with use of the present invention. The preferred embodiment of this invention would work in conjunction with IBM's virtual RFP subsystems, which would provide the necessary data for each of the job processing subsystems, using intra-grid subsystem communications, to provide a fully automated grid management system.

Figure 9:
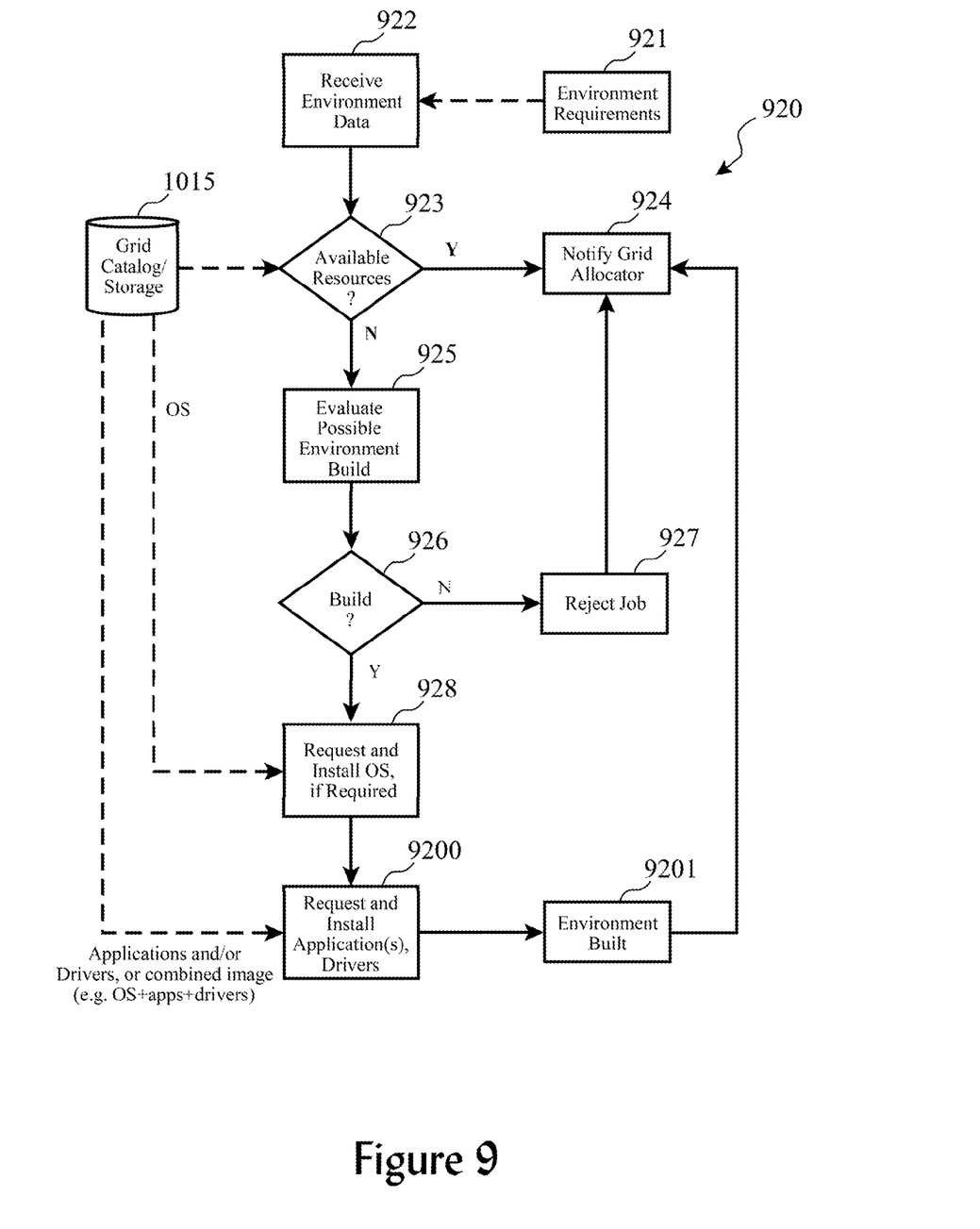
FIG. 9 illustrates one of the logical processes according to the present invention.

Turning to FIG. 9, our logical process (920) for dynamically building computing environments in a grid computing architecture is shown. First, environment requirements data (921) is received (922) from a resource allocation subsystem.

A resource allocation subsystem in a grid computing environment is responsible for identifying, allocating, and preparing local grid resources for inbound grid jobs via the grid scheduler. When current active grid resources are not sufficient to meet the requirements of one or more inbound grid jobs, the allocation subsystem alerts the dynamic build subsystem and passes relative data with respect to current resource availability, which has already been collected as part of the functionality in the allocation subsystem, including the additional required resources for job execution.

It is possible in some situations that for some inbound grid jobs, no suitable environment is currently active, and the entire environment must be built on demand, while in other cases, the majority of the required environment may be in place, and the dynamic build subsystem would create enough additional resources to complete the required environment.

At this point, the grid resource allocation subsystem has already determined which required resources are presently available in the currently running grid environment. Based on the total job requirement, and what is currently available, it is then extrapolated what additional resources are needed to complete build of the environment. The grid allocator also has already determined whether or not the remaining hardware requirements can be met via addition of inactive local hardware resources, or inactive remote hardware resources via virtual node grouping.

The grid dynamic build process then queries (923) the grid catalog and storage subsystem (1015) in order to determine whether or not the required software resources are available to activate the hardware resources with the needed software platform(s).

It is important to note that had active hardware resources been available either locally, or remotely via node grouping, the allocation subsystem would have simply added those resources to the environment, and would have only contacted the dynamic build module if software builds were required on any of those resources.

It should also be noted that in the case where active or inactive resources were obtained from remote grids via node grouping, that the dynamic build module at the local grid could control build of remote resources, or could request the build from the remote grid dynamic build subsystem to initiate activation of said resources, and to install the required operating system and application on these resources to meet job requirements.

If resources are not available to build the required environment, via all possible avenues including sell-off of the job to another grid vendor, then the job is rejected (927) and the client is informed that the job cannot be run. If on the other hand, it is determined that resources are available to build a new environment, the desirability of building the environment is determined (925).

Once a determination has been made that resources are available to build the required environment, the next step is to determine (25) whether or not it makes economic sense to build the required environment for the job at hand. Utilizing inactive resources can be expensive and can include fees for activation of various hardware resources, hardware maintenance costs for activated hardware, licensing fees for operating systems and applications, etc. As an example, if the revenue gained by the grid vendor for executing a given job is estimated to be $1000, and the estimated cost of building the required environment is found to be $1100, then the likely decision would be to reject the jobs.

If it is determined, via calculations of cost and revenue and/or other relevant criteria, that it is not desirable to build an environment to execute the job, then the inbound job would be rejected (927) and the grid allocator notified.

If, on the other hand, it is determined that a business reason exists to accept the job, then the dynamic build module would proceed to initiate build of the required environment. If hardware activation is required, the first step would be to activate the required hardware resources. Actual procedures required to accomplish this activation will vary by platform, however, some considerations are as follows:

(a) dynamic application of power, or IPL of inactive hardware;
(b) dynamic creation of a new hardware partition; and
(c) dynamic activation.

Various tools, applications, and commands are well known in the art which are capable of activating inactive hardware resources. It should also be noted, that the dynamic build module is only responsible for activation of hardware, and installation of required software for the required components. Upon completion of these tasks, the allocation subsystem is notified (924) that the required resources are now active and available, and it assumes responsibility for customization and integration into the environment as previously disclosed.

The grid catalog and storage subsystem (1015) is a comprehensive software repository, and all software within this repository is cataloged and indexed via standard designations used during the virtual RFP process. At this point, the dynamic build process requests (928) the desired operating system ("OS") image from the catalog and storage subsystem (1015). As an example, an installable image of IBM's AIX™ version 5.1 with maintenance level 1 may be designated as operating system A17-1. Based on this identifier, the catalog and storage subsystem provides a pointer to the dynamic build subsystem indicating the exact location of the required OS image.

Once the location of the required installation OS image is known by the dynamic build process (920), the dynamic build process initiates operating system installation (928) on the required node(s). Multiple methods exist for automated installation of software resources, however, by way of example, the following steps could be used to network install an IBM pSeries™ server with AIX™. It should be noted that the following sequence is intended as an example, and the actual commands and syntax may vary by operating system type and level:

(a) make install image available to install server (this could be accomplished using such methods, singularly or jointly, as alternate boot devices, NIM, PSSP, GPFS, NFS, etc.);
(b) define install client and required software resource(s) to install server (a variety of install servers and techniques are available);
(c) configure client network adapter(s) to "network boot" mode in node(s) to be installed;
(d) initiate "bootp" communications between client and server (client reboot or server ping can do this); and
(e) network install OS image to node(s).

It is possible that in some situation additional operating system maintenance is required above and beyond what is in the installed maintenance level. Emergency fixes and patches may need to be installed separately, using methods similar to those above.

Next, any needed application programs and/or drivers are located and installed on the node being built. This process is almost identical to the process just described for installing an operating system, except that a request (9200) is made to the grid catalog and storage subsystem (1015) based on a unique identifier for the application software and/or drivers that are required. The location of the application(s) and/or driver(s) is/are then identified, and the dynamic build module proceeds to the installation process.

In an alternate embodiment, popular combinations of operating system and application software are bundled into a single installation image, thus only the OS network install step is necessary. It is also possible that hybrid install solutions may be used whereby one or more application is bundled with the operating system, and others are installed separately.

The process followed to install one or more applications and/or one or more drivers is similar to the process described for network installing an operating system, except that different tools and processes are generally required for installing application software. When installing operating systems from an image, for example, all software is installed in file systems exactly as stored within the image used. With application software, however, although some application installation tools provide default installation points, many must be explicitly created or defined.

As an example, when installing IBM software on an AIX OS, the installp command is used, and the default installation filesystem is "/usr". If installing an Oracle™ database application on an IBM AIX™ OS, on the other hand, it is necessary to create the filesystem "/oracle/home", mount the database software source, and execute the operating system installation script from the binary source. These "installation rules" are preferably tied to the unique software identifier, and are stored in a table directly by the dynamic build module, or could be stored with the source software within the catalog and storage subsystem. In either case, the dynamic build module preferably is responsible for access of tools and execution of commands necessary to install the application software.

Finally, upon completion (9201) of the build process, including the operating system, any maintenance patches and upgrades required, and the application software, the dynamic build module informs (924) the grid allocation subsystem that the required resources are now active and available for use. At this point, the allocation subsystem takes control back from the dynamic build subsystem to complete the integration of the new resources into the grid for subsequent assignment of the job for execution.

CONCLUSION

It will be recognized by those skilled in the art that the foregoing examples and embodiment details are provided for illustration of the present invention, and that certain variations in embodiment may be made without departing from the spirit and scope of the present invention. Therefore, the scope of the invention should be determined by the following claims.

What is claimed is:

1. A grid management system comprising:
a computer processor;
a storage memory communicably disposed to the computer processor; and
program instructions embodied by the storage memory to cause the computer processor to perform steps comprising:
   determining, in advance of executing a computing job, whether an available underutilized computer resource in a first computing grid would meet cost or performance criteria specified by a source of the computing job; and
   responsive to determining that the cost or performance criteria specified by the source of the computing job would not be met by the available underutilized computer resource in the first computing grid:
      preventing the first computing grid from executing the computing job; and
      selling-off the computing job to a second computing grid.

2. The grid management system of claim 1 wherein the program instructions for determining comprise program instructions for calculating resource activation fees into the cost.

3. The grid management system of claim 2 wherein the calculating of resource activation fees further comprises evaluating resource activation fees selected from the group consisting of fees for activation of computing hardware resources, computing hardware maintenance costs, and computing hardware update costs.

4. The grid management system of claim 2 wherein the calculating of resource activation fees further comprises evaluating resource activation fees selected from the group consisting of fees for activation of computing software resources, computing software maintenance costs, computing software update costs, and licensing fees.

5. A computer program product for grid management comprising:
a storage memory communicably disposed to a computer processor; and
program instructions embodied by storage memory to cause the computer processor to perform steps comprising:
   determining, in advance of executing a computing job, whether an available underutilized computer resource in a first computing grid would meet cost or performance criteria specified by a source of the computing job; and
   responsive to determining that the cost or performance criteria specified by the source of the computing job would not be met by the available underutilized computer resource in the first computing grid:
      preventing the first computing grid from executing the computing job; and
      selling-off the computing job to a second computing grid.

6. The computer program product of claim 5 wherein the program instructions for determining comprise program instructions for calculating resource activation fees into the cost.

7. The computer program product of claim 6 wherein the calculating of resource activation fees further comprises evaluating resource activation fees selected from the group consisting of fees for activation of computing hardware resources, computing hardware maintenance costs, and computing hardware update costs.

8. The computer program product of claim 6 wherein the calculating of resource activation fees further comprises evaluating resource activation fees selected from the group consisting of fees for activation of computing software resources, computing software maintenance costs, computing software update costs, and licensing fees.

9. A method for grid management comprising:
determining, by a computer processor, in advance of executing a computing job, whether an available underutilized computer resource in a first computing grid would meet cost or performance criteria specified by a source of the computing job; and
responsive to determining that the cost or performance criteria specified by the source of the computing job would not be met by the available underutilized computer resource in the first computing grid:
   preventing, by the computer processor, the first computing grid from executing the computing job; and
   selling-off, by the computer processor, the computing job to a second computing grid.

10. The method of claim 9 wherein the determining comprises calculating resource activation fees into the cost.

11. The method of claim 10 wherein the calculating of resource activation fees further comprises evaluating resource activation fees selected from the group consisting of fees for activation of computing hardware resources, computing hardware maintenance costs, and computing hardware update costs.

12. The method of claim 10 wherein the calculating of resource activation fees further comprises evaluating resource activation fees selected from the group consisting of fees for activation of computing software resources, computing software maintenance costs, computing software update costs, and licensing fees.

* * * * *